July 4, 1933.  P. D. HARTOG  1,916,948
GREASE PUMP
Filed July 19, 1929  3 Sheets-Sheet 1

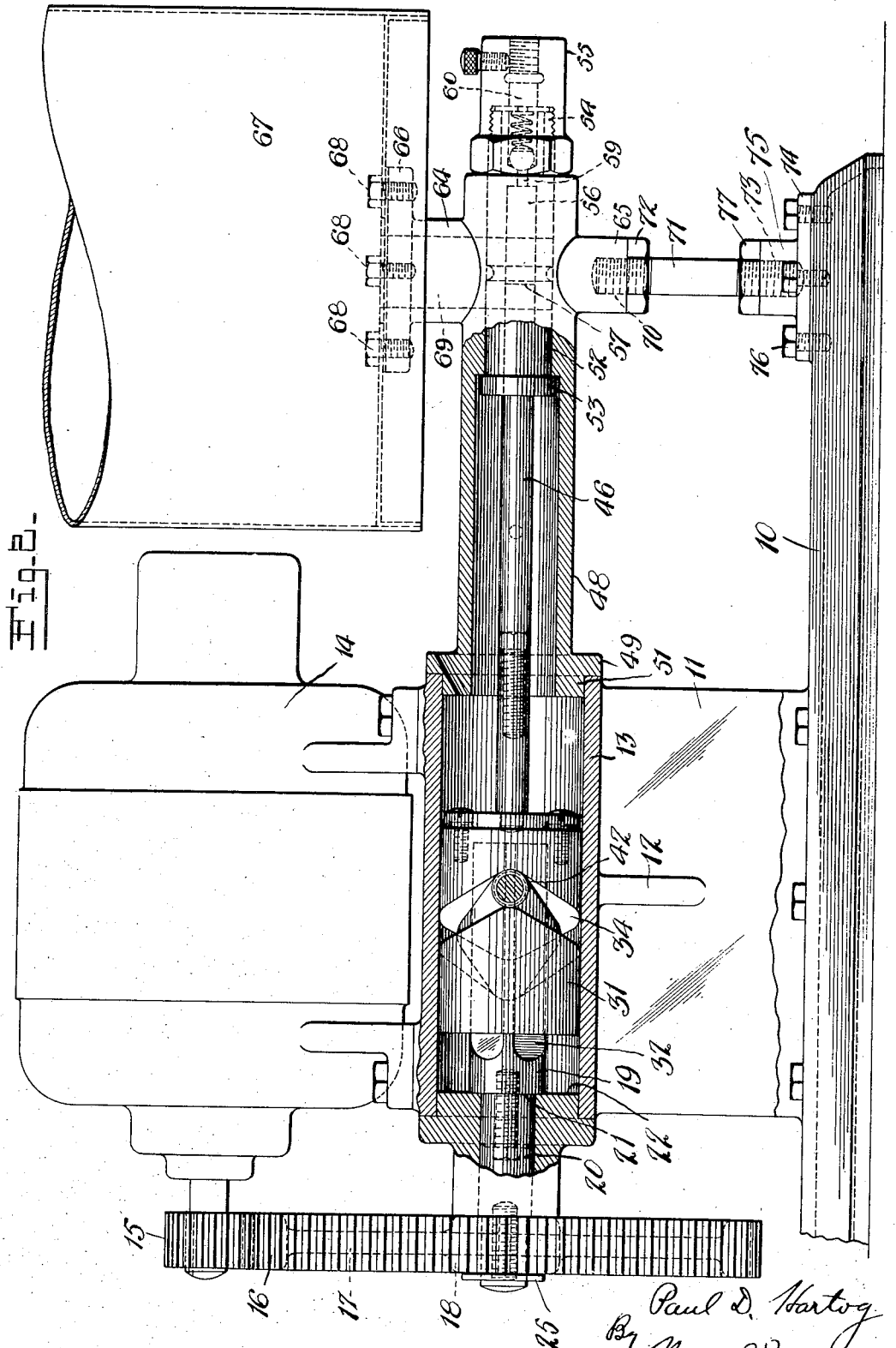

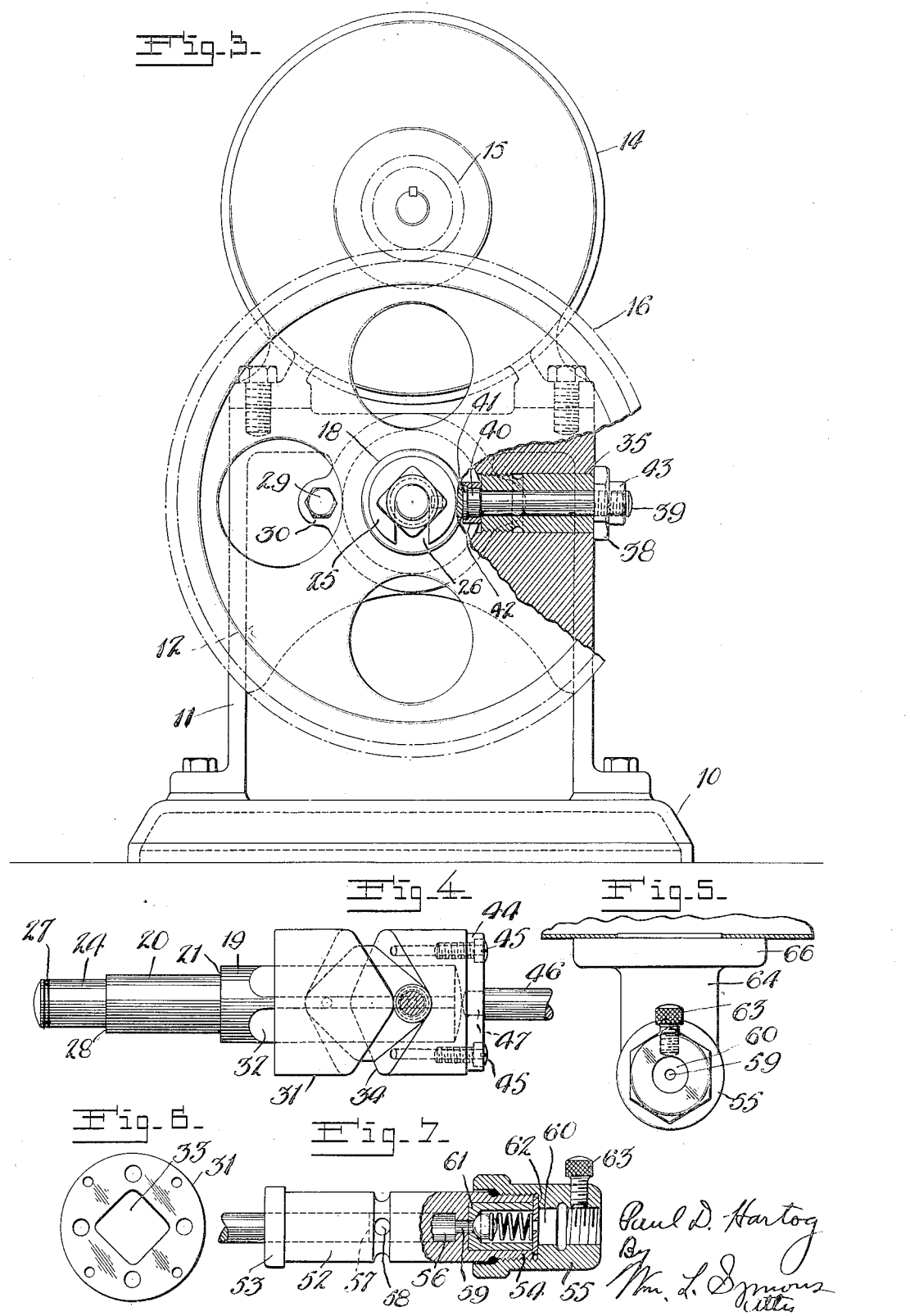

Patented July 4, 1933

1,916,948

UNITED STATES PATENT OFFICE

PAUL D. HARTOG, OF ST. LOUIS, MISSOURI, ASSIGNOR, BY MESNE ASSIGNMENTS, TO FRIER-HARTOG, INCORPORATED, A CORPORATION OF NEW YORK

GREASE PUMP

Application filed July 19, 1929. Serial No. 379,508.

This invention relates to grease pumps, more particularly to that class of grease pumps adapted for use in pumping lubricating grease to journals and bearings of machinery, and automotive chassis, and to be used to transfer grease lubricants from one container to another.

In that class of grease pumps in which is employed an eccentric or crank lever and connecting rod for the purpose of operating the piston of the pump reciprocally, there is a resulting out of balance produced by a construction of this kind, which at rotative speed causes objectionable vibrations, unnecessary wear, and noisy action of the parts. There is also an additional objection to the employment of an eccentric or crank lever upon a piston in that undue wear is effected upon the piston and cylinder in which the piston operates due to the force of the thrust which is set up by the angularity of the eccentric or crank with respect to the piston in the path of motion of the eccentric or crank, which tends to wear the piston and cylinder very rapidly, thereby affecting the efficient action of the pump because of leakage occurring between the piston and cylinder wall.

One of the objects therefore, of the present invention is to provide a grease pump constructed in such a novel way that the employment of an eccentric or crank lever and connecting rod is rendered unnecessary.

Another object is to provide a grease pump in which the operating parts are properly balanced, thereby reducing vibration and wear to a minimum.

A further object is to provide a grease pump in which the operating parts are positioned in axial lengthwise alignment, by which a smooth operating performance is insured.

Further and other objects of the present invention are to provide a grease pump of minimum production cost, and one in which the several parts are duplicable and interchangeable, compact in general arrangement; and one in which the moving parts are enclosed so that foreign matter in the form of grit, dust, and dirt cannot come in contact with the operating parts.

To such ends the invention comprises a novel construction and combined relation of mechanical member parts and in order therefore, that others skilled in the art to which this invention relates are enabled to understand, make and use the same, the following description is given supplemented by the accompanying drawings, in which:

Figure 2 is a side view in elevation, having an exposed cross-section thereof.

Figure 3 is a front elevation with a portion in section exposed.

Figure 4 is a detailed view of an assembly of operable member parts.

Figure 5 is an end view in elevation of the cylinder of this construction.

Figure 6 is an end view of one of the member parts.

Figure 7 is a view partly in section of the cylinder and member parts of this construction.

Figure 1:
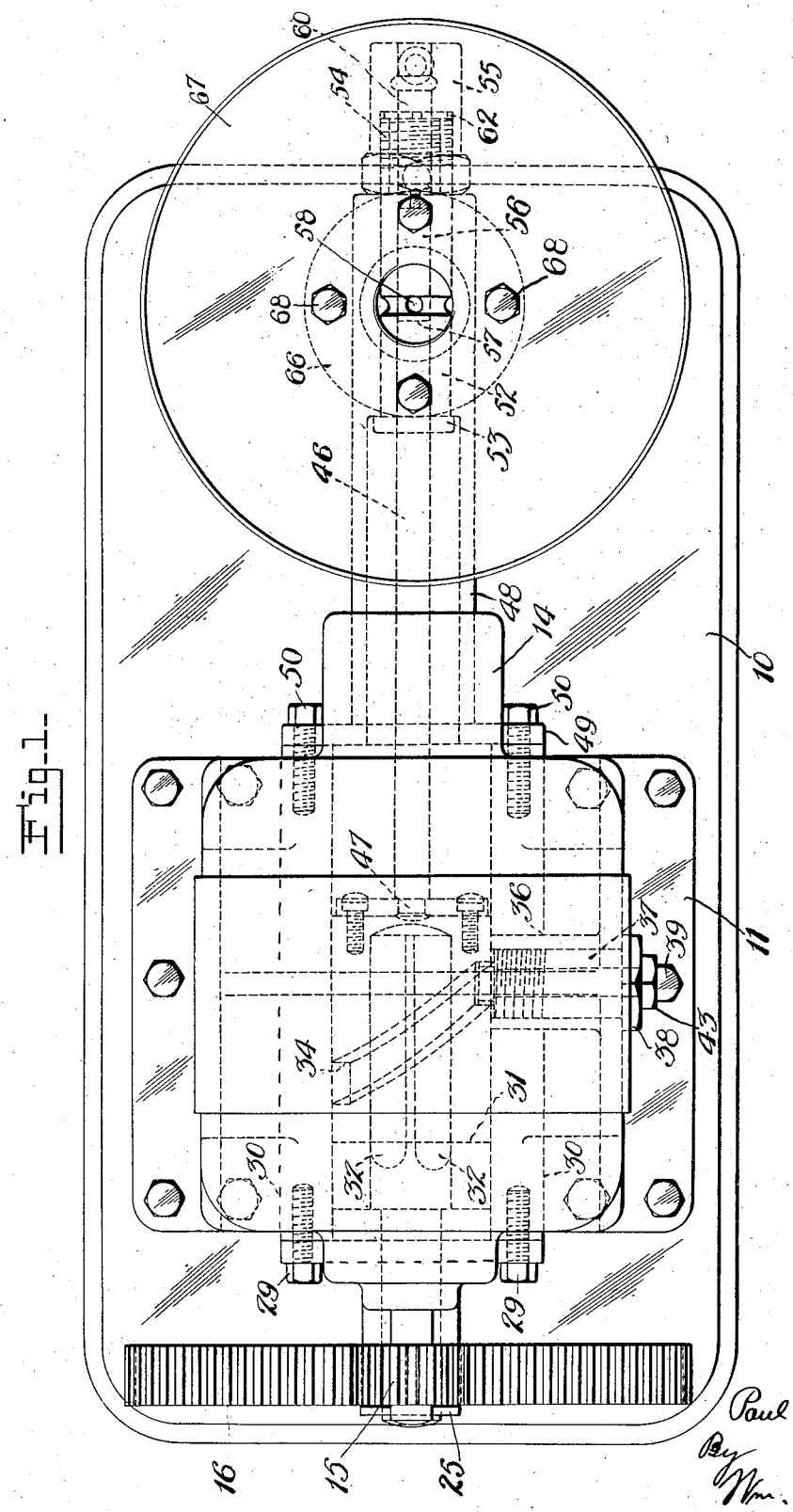
Figure 1 is a plan view of the present invention.

In the drawings the member parts are designated by numerals, like numerals designating like parts throughout the several views, accordingly numeral 10 designates a suitable base frame upon which is mounted a frame or support 11 provided with an internal reinforcement rib 12, and a lengthwise cylindrical bearing 13. Above the cylinder bearing 13, and upon the surface of the support 11 an electrical motor 14 is positioned the projecting end of the motor shaft having a driving gear 15 fixed thereto and adapted operatively to mesh with a driven gear 16, which gear has a web 17 and a central hub 18. The driven gear 16 is securely fixed to a rotative shaft 19 (a detailed view of which is shown in assembly Fig. 4). The rotative shaft 19 has a reduced end bearing portion 20 by which a shoulder 21 is provided, having a bearing against the surface of a projecting ledge 22 formed upon the journal 20, which journal is also provided with a flanged portion 24, the rotative shaft 19 extends beyond the bearing portion 20, having a projecting portion 24 which is slightly reduced and upon which the driven gear 16 is fixed and held securely against lateral displacement by means of a disc collar 25, which is provided with a slotted aperture 26, so that the disc collar thus constructed is adapted to be seated in a groove 27 formed on the shaft end 24. The reduced diameter of the shaft portion 24 provides a shoulder 28 against which the face of the hub 18 of the gear 16 is abutted, hence the face of the hub 18 and the shoulder 21 on the shaft provides a thrust bearing surface against the respective faces of the journal 20, the flanged portion 23ª of the journal 20 is provided with holes to receive clamping bolts 29 which enter threaded apertures formed in bosses 30, (designated in dotted outline Fig. 1) which bosses are positioned and formed within the supporting frame 11, whereby the journal 20 is clamped and securely held to the supporting frame 11 and prevented from disalignment by means of the ledge 22, the circumferential surface of which being accurately fitted into the lengthwise cylindrical bearing 13, whereby the journal 20 is accurately aligned with the bearing 13.

Projecting from the journal 20 and into the cylindrical bearings 13 is that portion of the rotative shaft 19, which has operative engagement with a circularly formed body 31, the circumferential surface of which is accurately fitted to the bearing 13. The rotative shaft 19 is provided with flat surfaces 32 formed and constructed to fit into an aperture 33, which is provided in and through the axis of the body 31, shaped and sized to accurately fit upon the surfaces 32 of the rotative shaft 19, a view of the shape of the aperture in the body 31 is shown in an end view thereof Fig. 6.

Upon the circumferential surface of the body 31 and midway of its length there is provided a cam shaped form 34 which extends circumferentially therearound and of limited depth therein, the cam shaped form having a predetermined helical pitch, the purpose of which will be hereinafter more fully explained.

Referring to Fig. 3 and in which there is shown in the exposed sectional view thereof an assembly unit positioned in an aperture 35 formed and positioned at a suitable location in the side of the support 11 and extending therethrough and within a boss 36 provided within and integral with the support 11 (a dotted outline of the boss referred to is shown in the plan view Fig. 1). The assembly unit thus positioned comprises members constituting a sleeve 37, having a hexagonal head 38 and provided with a lengthwise aperture and into which a stud 39 is positioned having a slightly enlarged end portion 40, which provides a slight shoulder for the stud 39, and an enlarged portion forming a rim 41. The enlarged end portion 40 and 41 has a roller 42 mounted thereon, which roller is provided with an aperture conforming in size and shape with the end of the stud 40 and 41, and upon which the roller has its bearing. The roller 42 is constructed and designed to roll freely upon its stationary bearing and within the cam shaped form 34 of the body 31, the stud 39 being clamped securely in the sleeve 37 by the hexagonal nut 43 upon the threaded end of the stud 39, which when tightened draws the shoulder of the stud firmly against the face of the sleeve 37. The entire assembly unit thus constructed and operatively positioned in the support 11 can be conveniently removed from the support in the event of the wearing of the roller 42, the worm roller can be displaced by that of a new roller the entire unit then reinserted into its aperture by screwing the sleeve 37 into the threaded portion within the aperture.

Attached to the end face surface of the body 31 there is removably attached a disc plate 44, which is secured to the end face of the body 31 by means of the screws 45 passing through holes slightly enlarged in the disc 44, which screws enter into threaded portions in the body 31. The enlarged holes within the disc 44 allow the slight adjustment of the disc, prior to the tightening of the screws, for the purpose of aligning the piston 46 operatively with the cylinder in which the piston operates. The piston rod 46 is securely fixed to the disc 44 by a shouldered edge 47 formed on the piston which edge is pressed tightly into a central hole formed in the disc plate 44 and therein riveted to the disc plate 44.

Connected to the support 11 and projecting therefrom is that of a trunk body 48, having an internal tubular form and provided with a flanged end 49, having apertures to receive clamping bolts 50 which enter into threaded holes formed in the internal bosses 30 of the support 11. Projecting from the flanged end 49 is a ledge 51, the circumferential edge of which is accurately fitted to the cylindrical bearing 13 by means of which the trunk body 48 is held securely in accurate alignment with the cylindrical bearing 13. Within the trunk body 48 a circularly formed member 52 is inserted in the respective position within the trunk 48 as indicated in the drawing Fig. 2, there being a rim 53 on the member 52 and a threaded end 54, upon which threaded end a cap 55 is screwed whereby the member 52 is held securely in position, the member 52 is shown in assembly with an exposed section thereof at Fig. 7. The member 52 is provided with an aperture 56 denominated "the cylinder" and in which the piston 46 operates reciprocally, the limit of its travel in the stroke backwardly is indicated in dotted outline 57, at which position the material to be pumped fills the space vacated by the piston through the port holes 58, and upon the forward stroke of the piston the material so received is forced forwardly through the small aperture 59 and then outwardly through the aperture 60 of the cap 55, to the threaded end of which there is an engaging connection (not shown) and through which, resulting from a consecutive number of strokes, the material is conveyed to the place desired.

For the purpose of preventing the return of the material acted upon by the piston through the small aperture 59, a check valve is provided consisting of the well known spring pressed ball upon a seat housed within a bushing or sleeve 61, the spring which presses against the ball is tensionally abutted against a sheet metal aperture disc 62, which is clamped against the face of the body 52 by the threaded cap 55. At the end of the cap 55 a threaded aperture is provided in which a thumb screw 63 is positioned and removable only in the event the pump requires priming for pumping purposes.

At a suitable position, approximately the end of the trunk body 48, projecting bosses are formed 64 and 65 respectively, which bosses are integrally joined with the trunk body. The boss 64 is provided with a flange 66, and upon which a grease container 67 is mounted and held securely by bolts 68, the projecting boss 64 has an internally cored chamber 69 through which the grease flows from the container to the cylinder, and into which the grease is drawn by the piston. The boss 65 is provided with a threaded aperture 70 and into which one end of a threaded stud 71 is screwed and held in position by a lock nut 72, the other threaded end of the stud 71 enters a stool having a flange portion 73 and a boss portion 74 in which boss portion 74 there is a non-threaded aperture 73 to receive the end of the stud 71. The flange portion 74 and a projecting hub 75 forming the stool have holes passing through the flange portion for clamping the bolts 76 which bolts screw into the base frame 10, thereby holding the stool firmly upon the base, the stud 71 is provided with a nut 77 which is adjustable upon the stud, the bearing face of the nut 76 rests upon the face of the hub 75, thereby resisting the load upon the trunk body 48 from the weight of the load in the container.

In the present invention it is obvious that the motor operates the train of gears with which the shaft 16 is connected and thereby rotated. The body 31 engaging the shaft 19, is also rotated by the shaft and the stationarily positioned roller 42 which is seated operatively within the cam shaped form on the body 31 operates upon the fixed stud 39 in the support 11 in consequence of which the body is moved forwardly and backwardly in a reciprocal movement to the extent of the pitch of the helical path of the cam shaped form, thus a rotatable and reciprocal movement is imparted to the body 31 and also to the piston with which the body is connected, the piston therefore is operated within the cylinder in the same way, that is, rotatably and reciprocally.

In accordance with the foregoing description, it is clear that the present invention fulfills the purpose for which it is intended and it is understood as well as conceded that various changes may be made in the details of the construction without departing from the spirit of this invention, understanding therefore that this invention is not to be limited to the specific construction shown and described.

I claim as my invention and desire to secure by United States Letters Patent:

1. In a pumping apparatus, a stationary grease receiving cylinder having an inlet and an outlet opening therein, a supply tank arranged adjacent said cylinder and communicating therewith through the inlet opening in the cylinder, said tank holding the fluid to be pumped, a piston arranged in said cylinder, a second cylinder arranged in alignment with the grease receiving cylinder and having a greater diameter than the grease receiving cylinder, a piston operating member arranged in said last named cylinder and bearing against the walls thereof, means adjustably connecting said piston operating member and said piston to permit aligning of said piston with its cylinder, means to rotate said piston operating member on an axis in alignment with the longitudinal axes of said cylinders, means whereby rotation of said piston operating member imparts a reciprocating motion to said piston in its cylinder, said reciprocating motion of the piston serving to alternately cover and uncover the inlet opening in the first mentioned cylinder, and a check valve arranged to close the outlet opening in the first mentioned cylinder on the non-pressure stroke of the piston.

2. In a pumping apparatus, a stationary grease receiving cylinder having an inlet and an outlet opening therein, a piston arranged in the said cylinder, a second cylinder arranged in alignment with the grease receiving cylinder and having a greater diameter than the grease receiving cylinder, a longitudinal shaft arranged centrally of said last named cylinder, a piston operating member arranged on said shaft and bearing against the walls of the last named cylinder, said member being slidable longitudinally of said shaft but being incapable of rotary movement relative thereto, means to rotate said shaft and the piston operating member thereon, means whereby rotation of said shaft and piston operating member impart a reciprocating motion to the piston, said reciprocating motion of the piston serving to alternately cover and uncover the inlet opening in the first mentioned cylinder, and a check valve arranged to close the outlet opening in the first mentioned cylinder on the non-pressure stroke of the piston.

3. In a pumping apparatus, a supporting frame, a pair of aligned cylinders having different diameters and arranged in spaced relation upon said frame, a motor mounted upon the larger of the two cylinders, and positioned with its rotor shaft in parallel relation to the longitudinal axis of the cylinder upon which it is mounted, a driving gear on the rotor shaft of said motor, a driven gear, a shaft operatively connected to said driven gear and extending into said cylinder of largest diameter and arranged parallel to the longitudinal axis thereof, a piston arranged in the cylinder of smallest diameter, a piston operating member slidably arranged on said last named shaft and bearing upon the inner walls of the cylinder of largest diameter, and means whereby rotary motion of said piston operating member causes a reciprocating motion of said piston in its cylinder.

4. A pumping apparatus comprising in combination, a pair of shafts operatively connected and arranged in parallel relation, a guide-way arranged in axial alignment with one of said shafts, a journal supportedly connected to said guide-way and supporting the said shaft in axial alignment with said guide-way, said last mentioned shaft having an unsupported free end portion constructed to provide driving means and a slide-way and projecting into said guide-way, a body embraced within said guide-way, said body having a cavity constructed for operative engagement upon the free end portion of the projected shaft within said guide-way, a piston rod connected detachably to and adjustable on said body, a cylinder for said piston, and a fluid supply container mounted upon said cylinder.

5. A pumping apparatus comprising in combination, a driving shaft and a driven shaft, a guide-way arranged in parallel relation with said driving shaft, a journal supportedly connected to said guide-way, said driven shaft supported by and bearing in said journal, said driven shaft having an unsupported free end portion projecting into said guide-way and constructed to provide driving means and a slide-way, a body embraced within said guide-way and operative upon the free end portion of said driven shaft, a piston rod connected detachably and adjustably upon said body, a cylinder for said piston, and a fluid supply container mounted upon said cylinder.

6. A pumping apparatus comprising in combination, a driving shaft and a driven shaft, a guide-way arranged in parallel relationship with said driving shaft and in axial alignment with said driven shaft, a journal supportedly connected to said guide-way, said driven shaft supported by and bearing in said journal, said driven shaft having an unsupported free end portion constructed to form a tenon and projecting into said guide-way, a body embraced within said guide-way and provided with a cavity constructed to form a mortise adapted for operative engagement upon the tenon of said driven shaft, a piston connected to said body, a cylinder for said piston, and a fluid supply container mounted upon said cylinder.

7. The combination with the piston rod of a grease pump, of a driving mechanism therefor comprising a cylinder aligned with the longitudinal axis of the piston rod, a piston operating member slidably engaging the cylinder and bearing upon the inner walls thereof, a cam groove about the periphery of said piston operating member, a member carried by said cylinder and projecting inwardly therefrom into said cam groove, and means to rotate said piston operating member.

8. An apparatus for imparting reciprocatory movement to the piston of a grease pump comprising a cylinder, a rotor shaft projecting axially into said cylinder, a piston operating body arranged in said cylinder and bearing upon the inner walls thereof, said body being capable of sliding movement relative to the shaft and rotatable therewith, a cam groove arranged circumferentially about said body, a member projecting radially inwardly from said cylinder wall and engaging said cam groove, and means to rotate said shaft.

In confirmation hereof I hereto attach my signature.

PAUL D. HARTOG.